US012564945B2

(12) United States Patent
Mao et al.

(10) Patent No.: US 12,564,945 B2
(45) Date of Patent: Mar. 3, 2026

(54) SYSTEM AND METHOD FOR CONTROLLING THE ROBOT, ELECTRONIC DEVICE AND COMPUTER READABLE MEDIUM

(71) Applicant: ABB Schweiz AG, Baden (CH)

(72) Inventors: Yichao Mao, Shanghai (CN); Zheng Ju, Shanghai (CN); Xiaohao Chen, Shanghai (CN)

(73) Assignee: ABB SCHWEIZ AG, Baden (CH)

(*) Notice: Subject to any disclaimer, the term of this patent is extended or adjusted under 35 U.S.C. 154(b) by 485 days.

(21) Appl. No.: 17/758,962

(22) PCT Filed: Jan. 22, 2020

(86) PCT No.: PCT/CN2020/073907
§ 371 (c)(1),
(2) Date: Jul. 15, 2022

(87) PCT Pub. No.: WO2021/147036
PCT Pub. Date: Jul. 29, 2021

(65) Prior Publication Data
US 2024/0173857 A1 May 30, 2024

(51) Int. Cl.
B25J 9/16 (2006.01)

(52) U.S. Cl.
CPC ............. B25J 9/163 (2013.01); B25J 9/1697 (2013.01)

(58) Field of Classification Search
CPC ............................... B25J 9/163; B25J 9/1697
See application file for complete search history.

(56) References Cited

U.S. PATENT DOCUMENTS

| | | | |
|---|---|---|---|
| 6,266,869 B1 | 7/2001 | Tracy et al. | |
| 6,353,774 B1 | 3/2002 | Goldenberg et al. | |
| 2014/0074289 A1* | 3/2014 | Xiao | B25J 9/163 |
| | | | 901/3 |

(Continued)

FOREIGN PATENT DOCUMENTS

| | | |
|---|---|---|
| CN | 104350408 A | 2/2015 |
| CN | 104511900 A | 4/2015 |

(Continued)

OTHER PUBLICATIONS

European Patent Office, Extended European Search Report dated Aug. 21, 2023, for corresponding patent application serial No. 20915259.4; 8-pages.

(Continued)

*Primary Examiner* — Jay Khandpur
(74) *Attorney, Agent, or Firm* — GREENBERG TRAURIG, LLP

(57) ABSTRACT

A system and a method for controlling the robot. The method includes determining, based on feedback data received from the robot, first position information of a joint of the robot. The feedback data indicates a movement of the joint. The method also includes determining second position information of the joint based on sensing data received from a sensor. The sensing data indicates a relative movement between the joint and a second object to be aligned with the first object. The method also predicts a target position for aligning the first object with the second object.

18 Claims, 6 Drawing Sheets

(56) References Cited

U.S. PATENT DOCUMENTS

| | | | | |
|---|---|---|---|---|
| 2015/0266183 A1* | 9/2015 | Alifragkis | ............. | B25J 9/1692 |
| | | | | 700/254 |
| 2016/0136815 A1* | 5/2016 | Linnell | ................. | B25J 9/1676 |
| | | | | 700/255 |
| 2018/0126553 A1* | 5/2018 | Corkum | ................. | B25J 9/1697 |
| 2018/0178388 A1 | 6/2018 | Ishige | | |
| 2019/0286159 A1 | 9/2019 | Terada | | |
| 2019/0299403 A1 | 10/2019 | Kokubo | | |
| 2021/0039259 A1* | 2/2021 | Duprez | ................. | B25J 9/1692 |

FOREIGN PATENT DOCUMENTS

| | | |
|---|---|---|
| CN | 105710885 A | 6/2016 |
| CN | 106777656 A | 5/2017 |
| CN | 106994696 A | 8/2017 |
| CN | 107992881 A | 5/2018 |
| CN | 108942917 A | 12/2018 |
| CN | 109318234 A | 2/2019 |
| CN | 109382824 A | 2/2019 |
| CN | 109571528 A | 4/2019 |
| CN | 110539315 A | 12/2019 |
| DE | 102017005194 C5 | 5/2022 |
| EP | 3229089 A1 | 10/2017 |
| EP | 3338969 A2 | 6/2018 |
| EP | 3520971 A1 | 8/2019 |
| JP | 2019158640 A | 9/2019 |
| WO | 2018053430 A1 | 3/2018 |
| WO | 2019190487 A1 | 10/2019 |

OTHER PUBLICATIONS

International Search Report and Written Opinion, issued by the ISA/CN National Intellectual Property Administration, regarding corresponding patent application Serial No. PCT/CN2020/073907; dated Oct. 28, 2020; 9 pages.

* cited by examiner

SYSTEM AND METHOD FOR CONTROLLING THE ROBOT, ELECTRONIC DEVICE AND COMPUTER READABLE MEDIUM

CROSS-REFERENCE TO RELATED APPLICATIONS

This is a national stage application which claims priority to International patent application Serial No.: PCT/CN2020/073907, filed on Jan. 22, 2020; and which is herein incorporated by reference in its entirety.

FIELD

Embodiments of the present disclosure generally relate to a system and a method for controlling the robot, an electronic device and computer readable medium.

BACKGROUND

High accuracy assembly (0.02 mm accuracy) is an important process in various applications. Assembly tasks using industrial robot have increase both in number and complexity over year. Conventionally, to achieve high accuracy requirements, the system needs multiple cycles of measuring and moving to reach the accuracy, which may cause a significant overhead in cycle time.

For example, when a robot arm holding a workpiece to be assembled moves a step, the sensor may capture the position of the workpiece and the deviation of this workpiece from its counterpart and transmit the sensing data to the controller. The controller may further trigger the motion of the robot based on the sensing data. Thus, a plurality of cycles of moving-sensing-servoing may be performed. Besides the time consumption, the commission time and cost are increased, because an accurate calibration is required to reduce the amount of sensing and moving cycles.

SUMMARY

Embodiments of the present disclosure provide a system and a method for controlling the robot and computer readable medium.

In a first aspect, a method is provided. The method comprises determining, based on feedback data received from the robot, first position information of a joint of the robot, the feedback data indicating a movement of the joint to which a tool being attached for holding a first object; determining second position information of the joint based on sensing data received from a sensor, the sensing data indicating a relative movement between the joint and a second object to be aligned with the first object; and generating, based on the first and the second position information, a prediction of a target position for aligning the first object with the second object.

In this way, a high accuracy assembly could be achieved with shorter servo time, so that the assembly cost can be reduced and the assembly efficiency can be improved.

In some embodiments, determining the first position information comprises receiving the feedback data from the robot in a first time period; obtaining, from the feedback data, a set of coordinate parameters of the robot in a first coordinate system of the robot; and determining the first position information based on the set of coordinate parameters.

In some embodiments, determining the second position information comprises receiving the sensing data from the sensor in a second time period, the second time period at least partially overlapping with a first time period for receiving the feedback data; obtaining, from the sensing data, a set of position relationships between the first object and the second object in a second coordinate system of the sensor; and determining the second position information based on the first set of position relationships.

As described above, both the data from the robot-side and the sensor-side will be collected by the system and transformed to the respective position information, which are necessary for a subsequence estimation of the target position of the robot. In particular, instead of transmitting only the sensing data related to a single operation of the robot, a set of the feedback and sensing data captured in a certain time period may be transmitted to the data collector, which is advantageous for prediction of the target position, because the result of the prediction will be more accurate and the prediction process will be accelerated at the same time.

In some embodiments, generating the prediction comprises obtaining, from the first position information, a first set of sampled parameters characterizing a reference position of the joint at a predetermined time point; obtaining, from the second position information, a second set of sampled parameters characterizing a reference position relationship between the joint of the robot and the second object at the predetermined time point; and generating the prediction of the target position by fusing the first set of sampled parameters and the second set of sampled parameters based on a predetermined fusion mode associated with an expected operation to be performed by the robot.

In some embodiments, the predetermined fusion mode comprises at least one of the following: a predictor mode, a filter mode, a sum mode and a subtraction mode.

In the process of data fusion, the position information of the robot and the position information of the object at the same acquisition time point can be considered as data for predicting the target position. By predicting the target position based on data from different data sources, high-quality prediction results may be obtained more efficiently. Meanwhile, a plurality of fusion mode corresponding to the certain operator may be predetermined based on the desired operation process of the robot. In this way, any excepted robot operation procedure may be more easily implemented and developed.

In some embodiments, the method further comprises generating a command for controlling the robot at least partially based on the prediction.

In some embodiments, generating the command comprises determining a set of recording time points in a third time period for recording the feedback data, a start time point of a first time period for receiving the feedback data deviating from a start time point of the third time period by a predetermine time delay; determining, based on the prediction, a predicted time point when the first object reaches the target position; determining a predicted trajectory through which the first object moves to the target position based on the set of recording time points, the feedback data, the predicted time point and the prediction of the target position; and generating the command based on the predicted trajectory. In this way, the result of the prediction could be further optimized to smooth the moving path to the target position for the robot.

In a second aspect, a system is provided. The system comprises a data collector coupled to the robot and configured to determine, based on feedback data received from the robot, first position information of a joint of the robot, the feedback data indicating a movement of the joint to which a tool being attached for holding a first object, coupled to a sensor and configured to determine second position information of the joint based on sensing data received from the sensor, the sensing data indicating a relative movement between the joint and a second object to be aligned with the first object. The system further comprises a first estimator coupled to the data collector and configured to generate, based on the first and the second position information, a prediction of a target position aligning the first object with the second object.

In some embodiments, the data collector is further configured to receive the feedback data from the robot in a first time period; obtain, from the feedback data, a set of coordinate parameters of the robot in a first coordinate system of the robot; and determine the first position information based on the set of coordinate parameters.

In some embodiments, the data collector is further configured to receive the sensing data from the sensor in a second time period, the second time period at least partially overlapping with a first time period for receiving the feedback data; obtain, from the sensing data, a set of position relationships between the first object and the second object in a second coordinate system of the sensor; and determine the second position information based on the first set of position relationships.

In some embodiments, the first estimator is further configured to obtain, from the first position information, a first set of sampled parameters characterizing a reference position of the joint at a predetermined time point; obtain, from the second position information, a second set of sampled parameters characterizing a reference position relationship between the joint of the robot and the second object at the predetermined time point; and generate the prediction of the target position by fusing the first set of sampled parameters and the second set of sampled parameters based on a predetermined fusion mode associated with an expected operation to be performed by the robot.

In some embodiments, the predetermined fusion mode comprises at least one of the following: a predictor mode, a filter mode, a sum mode and a subtraction mode.

In some embodiments, the system further comprises a command generator coupled to the first estimator and configured to generate a command for controlling the robot at least partially based on the prediction.

In some embodiments, the command generator is further configured to determine a set of recording time points in a third time period for recording the feedback data, a start time point of a first time period for receiving the feedback data deviating from a start time point of the third time period by a predetermine time delay; determine, based on the prediction, a predicted time point when the first object reaches the target position; determine a predicted trajectory through which the first object moves to the target position based on the set of recording time points, the feedback data, the predicted time point and the prediction of the target position; and generate the command based on the predicted trajectory.

In a third aspect, an electronic device is provided. The electronic device comprises a processor; and a memory coupled to the processor and storing instructions for execution, the instructions, when executed by the processor, causing the device to perform the method of the first aspect.

In a fourth aspect, a computer readable medium is provided. The computer readable medium comprises program instructions for causing an electronic device to perform at least the method of the first aspect.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, same reference numerals usually represent same components.

Throughout the drawings, the same or similar reference symbols are used to indicate the same or similar elements.

DETAILED DESCRIPTION

Figure 1:
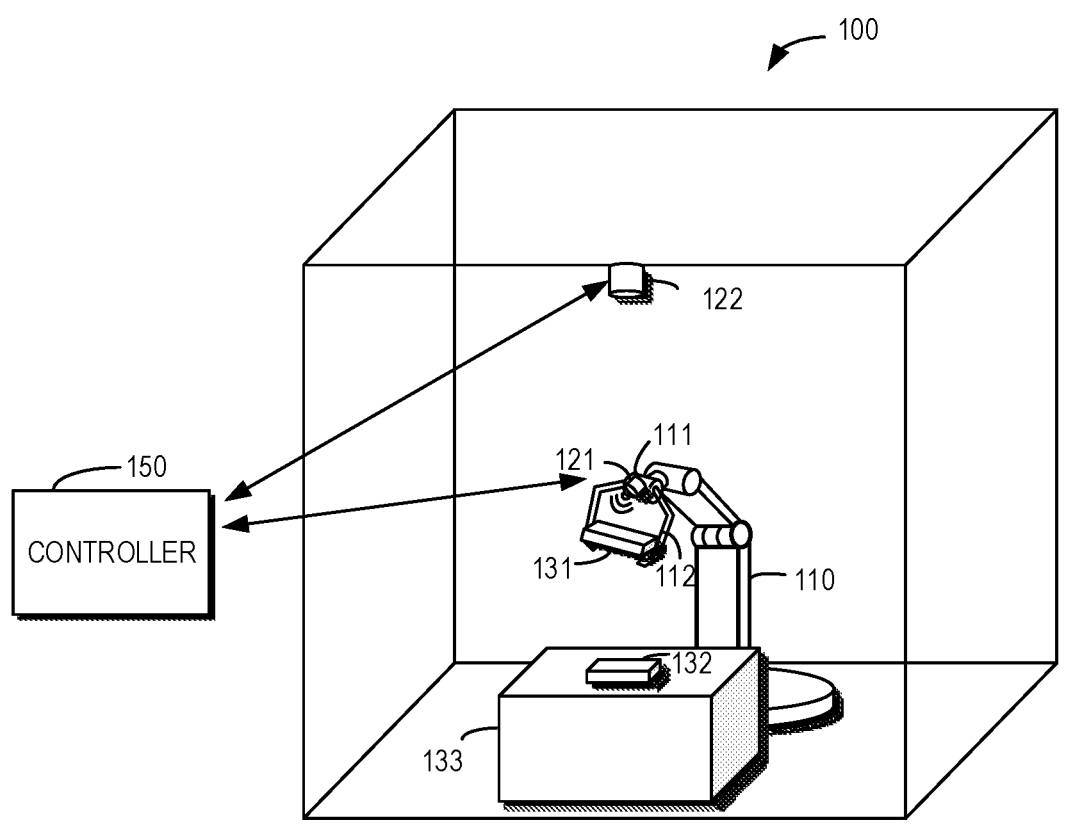
FIG. 1 shows an example operating environment in which embodiments of the present disclosure may be implemented.

The present disclosure will now be discussed with reference to several example embodiments. It is to be understood these embodiments are discussed only for the purpose of enabling those skilled persons in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the figures. Other definitions, explicit and implicit, may be included below.

FIG. 1 shows an example operating environment 100 in which embodiments of the present disclosure may be implemented. As shown in FIG. 1, the operating environment 100 may comprise a robot 110. The robot 110 may fixed on the ground. The robot 110 may comprise an operating arm having a joint 111, such as the joint at the end of the operating arm. A tool 112 may be attached to the joint 111 for holding an object to be assembled. For example, the tool 112 may be formed as a pin, a gripper or glue gun. As shown in FIG. 1, the tool 112 is formed as a gripper to grip a workpiece. Hereinafter the workpiece gripped by the tool 112 may be referred to the first object 131.

On an assembly table 133, there is a further workpiece, which may be referred as a second object 132 hereinafter. The second object 132 may be considered as a counterpart of the first object 131 in an assembly procedure. To assembly the first object with the second object, an alignment process for the first and second objects may be required. Herein the alignment may refer to complete matching or partial matching. For example, they may be placed on top with other or placed next to each other without overlapping. The position at which the first object 131 aligned with the second object 132 may be referred to a target position. In some cases, the second object 132 may be stationary. However, the second object 132 may also be movable, for example, due to a magnetic force generated by a magnetic field.

The operating environment 100 as shown in FIG. 1 may also comprise a plurality of sensors 121 and 122, and a controller 150 coupled to these sensors to collect the sensing data from these sensors. The controller 150 may communicate with sensors 121 and 122 by a communication module (not shown) wired or wireless. For example, the sensor 121 (hereinafter may also be referred to as the first sensor 121) may be arranged on the joint 111 of the robot 110. The sensor 122 (hereinafter may also be referred to as the second sensor 122) may be arranged in the environment. Both the first sensor 121 and the second sensor 122 can observe the robot 110, the first object 131 and the second object 132. It is to be understood that the number of sensors shown in FIG. 1 is given for the purpose of illustration without suggesting any limitations. The operating environment 100 may include any suitable number of sensors.

As described above, the high accuracy assembly (0.02 mm accuracy) is an important process in various applications. Assembly tasks using industrial robot have increase both in number and complexity over year. Conventionally, to achieve high accuracy requirements, the system needs multiple cycles of measuring and moving to reach the accuracy, which may cause a significant overhead in cycle time.

For example, when a robot arm holding a workpiece to be assembled moves a step, the sensor may capture the position of the workpiece and the deviation of this workpiece from its counterpart and transmit the sensing data to the controller. The controller may further trigger the motion of the robot based on the sensing data. Thus, a plurality of cycles of moving-sensing may be performed. Besides the time consumption, the commission time and cost are increased, because an accurate calibration is required to reduce the amount of sensing and moving cycles.

Therefore, the present disclosure proposes a solution for a high accuracy assembly supporting by the robot. With the feedback data and sensing data collected in the alignment procedure, the amount of sensing and moving cycles could be reduced and a high accuracy assembly can be achieved at the same time.

Figure 2:
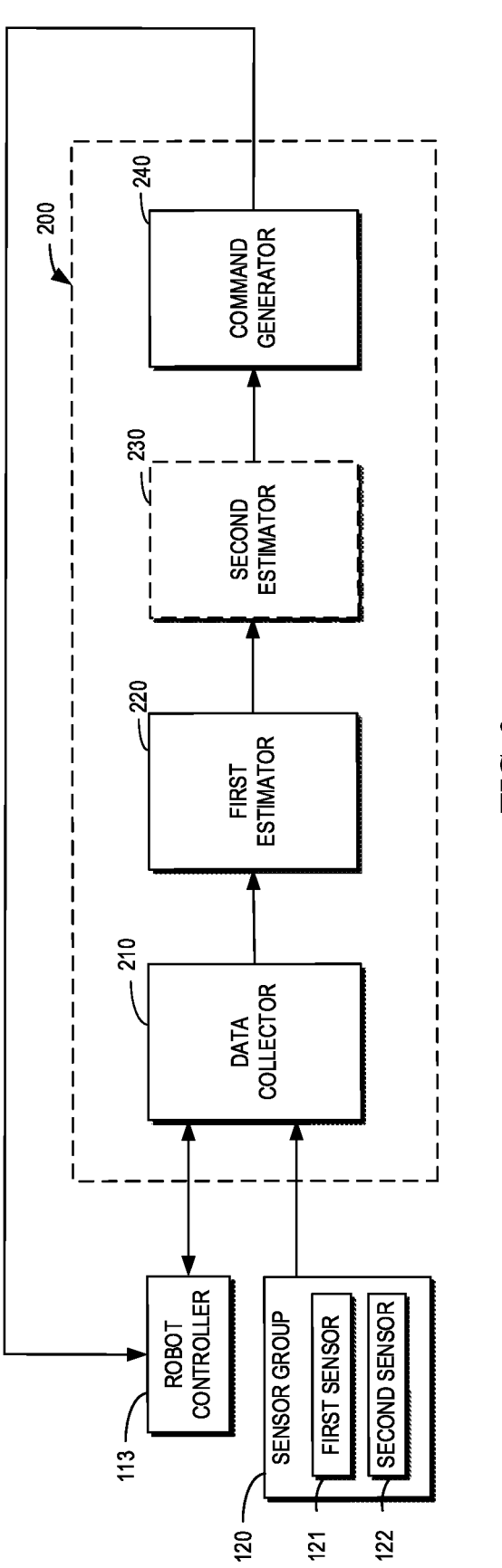
FIG. 2 shows a schematic diagram of a system for controlling the robot according to embodiments of the present disclosure.

Principle and implementations of the present disclosure will be described in detail below with reference to FIGS. 2 to 5. FIG. 2 shows a schematic diagram of a system for controlling the robot according to embodiments of the present disclosure. For the purpose of discussion, the system

200 will be described with reference to FIG. 1. It would be appreciated that although the system 200 has been described in the operating environment 100 of FIG. 1, this system 200 may be likewise applied to other operating environments.

As shown in FIG. 2, the system 200 may comprise a data collector 210. The data collector 210 may be coupled to a robot controller 113. When the operating arm of the robot 110 starts to move, the robot controller 113 can record the position of the joint 111 in the movement. The recorded data, which may be hereinafter referred to as feedback data may be transmit from the robot controller 113 to the data collector 210.

The data collector 210 may determine first position information of the joint 111 of the robot 110 based on the received feedback data. The feedback data may indicate a movement of the joint 111 to which a tool 112 being attached for holding a first object 131.

In some embodiments, the feedback data may be referred to a set of coordinate parameters of a joint 111 of the robot 110 in a coordinate system of the robot 110 recorded by the robot controller 113 in a first time period in a process of the robot movement. For example, parameters of the robot Tool Center Point (TCP) may be considered as the feedback data.

For an industrial robot, one or more tools may be installed on the robot to operate the object. To describe the tool in a space, a coordinate system on the tool, namely the tool coordinate system (TCS) may be defined and the origin of the tool coordinate system may be considered as a TCP. In the TCS, six degrees of freedom or six pieces of information are typically required to completely define the pose of the end joint of the robot, because it can move along three directions in a space and also rotate around the three directions. In some embodiments, the first data collector 111 then may determine first position information of the robot based on the set of coordinate parameters.

Further, the data collector 210 may be coupled to the sensing group 120 including the first sensor 121 and the second sensor 122 and receive the sensing data from at least one sensor of them. The data collector 210 may determine second position information of the joint 111 based on sensing data received from any of the first sensor 121 and the second sensor 122. For example, the sensing data of the second sensor 122 may be transmitted to the data collector 210. The sensing data may indicate a relative movement between the joint 111 and a second object 132 to be aligned with the first object 131.

For example, the sensing data may be referred to as a set of images captured by the sensor in a second time period. The set of images may reflect a set of position relationships between the first object 131 and the second object 132 in coordinate system of the second sensor 122. The second time period may be overlapped with the first time period, during which the feedback data is received by the data collector 210.

As shown in the FIG. 2, the system 200 may further comprise a first estimator 220. The first estimator 220 may be coupled to the data collector 210 and configured to generate a prediction of a target position for aligning the first object 131 with the second object 132 based on the first and the second position information.

In some embodiments, the first position information and the second position information could be fused in the first estimator 220. For example, the first estimator 220 may obtain a first set of sampled parameters from the first position information and obtain a second set of sampled parameters from the second position information. The first set of sampled parameters may characterize a reference position of the joint 111 at a predetermined time point and the second set of sampled parameters may characterize a reference position relationship between the joint 111 of the robot 110 and the second object 132 at the same time point.

In some embodiments, the first estimator 220 may further generate at prediction of the target position by fusing the first set of sampled parameters and the second set of sampled parameters based on a fusion mode, which may be associated with an expected operation to be performed by the robot.

Figures 3A, 3B, 3C:
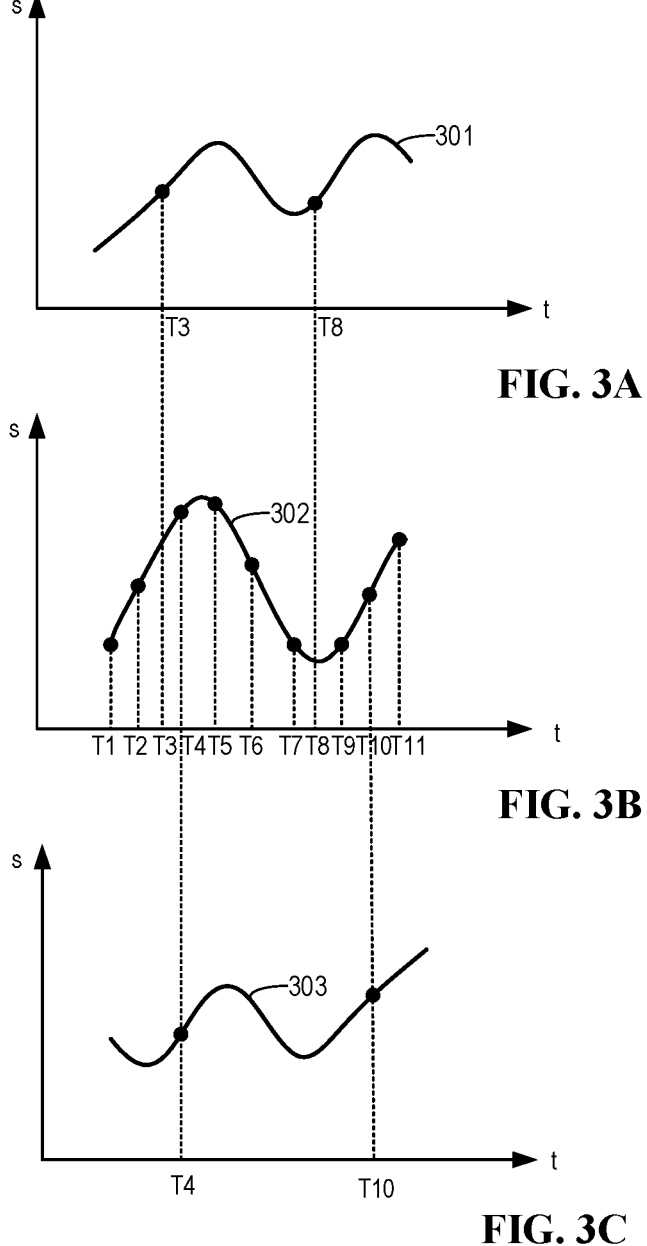
FIGS. 3A-3C show example processes of data fusion according to embodiments of the present disclosure.

With reference to FIGS. 3A and 3B, the data fusion of the first set of sampled parameters from the first position information and the second set of sampled parameters from the second position information may be further described in detail.

FIG. 3A shows an example of a curve 301 of a sampled signal associated with the second position information and FIG. 3B shows an example of a curve 302 of a sampled signal associated with the first position information. As shown in FIG. 3A, the second set of sampled parameters may refer to parameters at time points T3 and T8. That is, a set of parameters sampled at time point T3 of the curve 301 may reflect the position relationship between the joint 111 of the robot 110 and the second object 132 at the time point T3 captured by the second sensor 122, for example. To fuse the first and the second sets of parameters, parameters sampled at T3 of curve 302 may be required. However, the parameters sampled at T3 of the curve 302 may not be read from the curve 302 directly. That is, the first set of sampled parameters may not be direct obtained from the first position information. Instead, the sampled parameters at time point T3 of the curve 302 may be calculated based on the parameters sampled at other sampled time points, for example, based on parameters sampled at T2 and T4 of the curve 302. The sampled parameters at time point T3 of the curve 302 may reflect the position of the joint at the time point T3. Then, the sampled parameters at time point T3 of the curve 301 may be fused with sampled parameters at time point T3 of the curve 302, to generate a prediction of the target position of the robot. For the data fusion of the parameters sampled at time point T8 of both curve 301 and 302, an analogous procedure may be performed.

In some embodiments, the first estimator 220 also include an operator pool to provide the operators corresponding to the fusion mode, such as a Kalman mode, a Predictor mode, a Filter mode, an Observer mode, a Sum mode or a Subtraction mode. These fusion modes may be preconfigured for the specific task assigned by the sensor model.

In the process of data fusion, different position parameters determined by the sensing data from different sensor groups at the same acquisition time point can be considered as position information for predicting the target position. Since the sensing data provides different position parameters in multiple view points, a high-quality prediction results may be obtained more efficiently. Meanwhile, a plurality of fusion mode corresponding to the certain operator may be predetermined based on the desired operation process of the robot. In this way, any excepted robot operation procedure may be more easily implemented and developed.

Referring back to FIG. 2, the system 200 may also comprises a command generator 240 coupled to the first estimator 220. The command generator 240 may be configured to generate a command for controlling the robot 110 based on the prediction of the target position. The command generator 240 may be coupled to the robot controller 113 to transmit the command to the robot controller 113.

To further smooth the moving path of the first object 131 and safe the cycle time for alignment, a predicted trajectory for guiding the first object from the current position to the target position may be determined. In some embodiments, the command generator 240 may determine a set of recording time points in a third time period for recording the feedback data. The start time point of a first time period for receiving the feedback data may deviate from a start time point of the third time period by a predetermine time delay.

The recording time point of the feedback data may be determine in the data collector 210. Furthermore, the data collector 210 may also record the receiving time points for each feedback data and compensate a predetermined time delay to the receiving time point of the feedback data, to obtain recording time points of the feedback data. Also, the data collector 210 may also record the receiving time points for each sensing data and compensate a predetermined time delay to the receiving time point of the sensing data, to obtain sensing time points of the sensing data. For example, if the timestamp T_record represents the time when the system 200 receives the data, the sampled time point T_record of the data, at which the data is exactly sampled, may represent as T_receive subtracts the time delay T_delay of the sensor.

Further, the command generator 240 may determine a predicted time point when the first object reaches the target position based on the prediction of the target position. Based on the set of recording time points, the feedback data, the predicted time point and the prediction of the target position, the predicted trajectory can be determined. The command generator 240 can generate the command based on the predicted trajectory. Through the predicted trajectory, the first object 131 can move to the target position.

In some embodiments, more than one sensor may transmit the sensing data to the data collector 210 and therefore a plurality of the predictions of the target position may be generated at the first estimator 220. In this case, the plurality of the predictions may be considered as preliminary predictions and may be further fused to generate a final prediction.

Alternatively, the system 200 may also comprise a second estimator 230. As shown in FIG. 3, the other sensor in the sensor group, for example, the first sensor 121 may transmit the sensing data to the data collector 210. The data collector 210 may determine the third position information of the joint 111 of the robot 110 based on the sensing data received from the first sensor 121. This sensing data may be obtained by sensing a motion of the joint 111 of the robot 110. As an option, the information of the joint 111 of the robot 110 may also be obtained from the robot controller 113.

As described above, the first position information and the second position information obtained from the data collector 210 may be fused to generate a prediction of the target position of the robot 110. Similarly, the first estimator 220 may further generate a further prediction of the target position based on the first position information and the third position information, for example by fusing the first position information and the third position information.

Further referring to FIGS. 3B and 3C, the procedure of the data fusion of the first position information and the third position information may be similar with that of the first position information and the second position information.

FIG. 3C shows an example of a curve 303 of a sampled signal associated with the third position information and FIG. 3B shows an example of a curve 302 of a sampled signal associated with the first position information. As shown in FIG. 3C, the third set of sampled parameters may refer to parameters at time points T4 and T10. That is, a set of parameters sampled at time point T4 of the curve 303 may reflect the position relationship between the second object 132 and the joint 111 of the robot 110 captured by the first sensor 121 at the time point T4, for example. To fuse the first and the third sets of parameters, parameters sampled at T4 of curve 302 may be required. However, the parameters sampled at T4 of the curve 302 may not be read from the curve 302 directly. That is, the first set of sampled parameters may not be direct obtained from the first position information. Instead, the sampled parameters at time point T4 of the curve 302 may be calculated based on the parameters sampled at other sampled time points, for example, based on parameters sampled at T2 and T5 of the curve 302. The sampled parameters at time point T4 of the curve 302 may reflect the position of the joint 111 at the time point T4. Then, the sampled parameters at time point T4 of the curve 303 may be fused with sampled parameters at time point T4 of the curve 302, to generate a further prediction of the target position of the robot 110. For the data fusion of the parameters sampled at time point T10 of both curve 303 and 302, an analogous procedure may be performed.

Figure 4A:
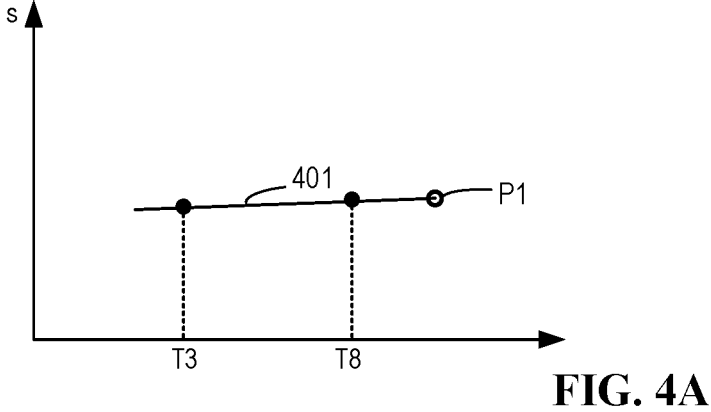
FIGS. 4A-4B show example results of data fusion shown in FIGS. 3A-3C according to embodiments of the present disclosure.
Figure 4B:
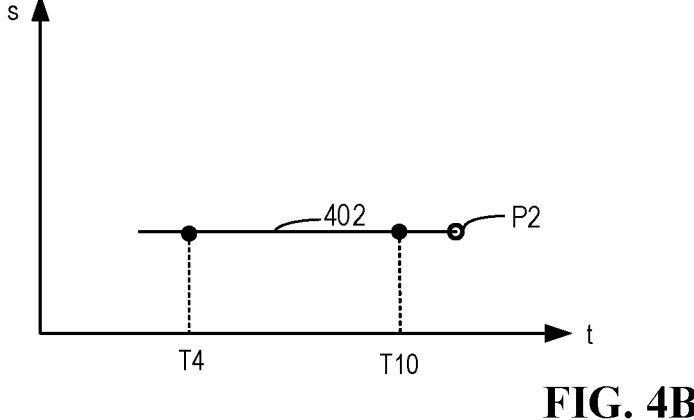

FIGS. 4A-4B show example results of data fusion shown in FIGS. 3A-3C according to embodiments of the present disclosure. FIG. 4A shows a result of data fusion of the first and the second position information and the FIG. 4B shows a result of data fusion of the first and the third position information. For example, the value of the curve 401 shown in FIG. 4A represent a result of data fusion of the parameters of the first position information and the second position information at the time point T3. Based on the curve 401 obtained by fusing the first and the second position information and the curve 402 obtained by fusing the first and the third position information, two preliminary prediction of the target position may be generated, namely the value of P1 in curve 401 and the value P2 of the curve 402.

Referring back to FIG. 3, the system 200 may also comprise a second estimator 230. The second estimator 230 may be coupled to the first estimator 220 and generate a final prediction of the target position by fusing the prediction of the target position and the further prediction of the target position. For example, as shown in FIGS. 4A and 4B, the preliminary prediction of the target position P1 and the preliminary prediction of the target position P2 may be fused, the fused value may be considered as a final prediction of the target position. In this case, the command generator 240 may generate the command for controlling the robot 110 based on this final prediction of the target position.

The data fusion for generating the final prediction may be considered as a second fusion procedure. The preliminary predictions of target position/orientation may be sent to the buffer with a timestamp in the second fusion module in the second estimator. In most applications, the object moves at a relatively lower speed compared to the motion of the robot. Hence, the regression of target position and orientation may provide a more reliable prediction than the regression of sensor data.

It is to be understood that the system 200 as shown in FIG. 2 may be implemented with any hardware and software. For example, the system 200 may be implemented as the controller 150 as shown in FIG. 1. The system 200 may also be implemented as an integrate chip. The components of the system 200 may be considered as entities capable of performing certain functions, such as data collectors, estimators, instruction generators, and the like. The components in the system 200 may also be considered as virtual modules capable of implementing certain functions.

In this way, a high accuracy assembly could be achieved with shorter servo time, so that the assembly cost can be reduced and the assembly efficiency can be improved.

Figure 5:
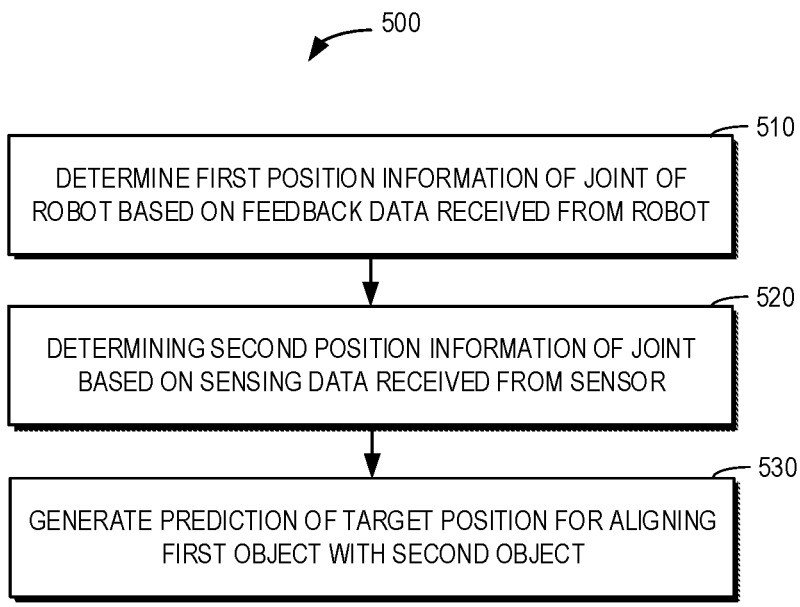
FIG. 5 shows a flowchart illustrating a method for controlling the robot according to embodiments of the present disclosure.

FIG. 5 shows a flowchart illustrating a method for controlling the robot according to embodiments of the present disclosure. For the purpose of discussion, the method 500 will be described from the perspective of the system 200 with reference to FIG. 2.

At 510, the system 200 determines, based on feedback data received from the robot 110, first position information of a joint 111 of the robot 110. The feedback data may indicate a movement of the joint 111 to which a tool 112 being attached for holding a first object 131.

At 520, the system 200 determines second position information of the joint 111 based on sensing data received from a sensor 122. The sensing data may indicate a relative movement between the joint 111 and a second object 132 to be aligned with the first object 131.

In some embodiments, determining the first position information comprises receiving the feedback data from the robot 110 in a first time period; obtaining, from the feedback data, a set of coordinate parameters of the robot 110 in a first coordinate system of the robot 110; and determining the first position information based on the set of coordinate parameters.

In some embodiments, determining the second position information comprises receiving the sensing data from the sensor 122 in a second time period, the second time period at least partially overlapping with a first time period for receiving the feedback data; obtaining, from the sensing data, a set of position relationships between the first object 131 and the second object 132 in a second coordinate system of the sensor 122; and determining the second position information based on the first set of position relationships.

At 530, the system 200 generates, based on the first and the second position information, a prediction of a target position for aligning the first object 131 with the second object 132.

In some embodiments, generating the prediction comprises obtaining, from the first position information, a first set of sampled parameters characterizing a reference position of the joint at a predetermined time point; obtaining, from the second position information, a second set of sampled parameters characterizing a reference position relationship between the joint of the robot and the second object at the predetermined time point; and generating the prediction of the target position by fusing the first set of sampled parameters and the second set of sampled parameters based on a predetermined fusion mode associated with an expected operation to be performed by the robot.

In some embodiments, the predetermined fusion mode comprises at least one of the following: a predictor mode, a filter mode, a sum mode and a subtraction mode.

In some embodiments, the system 200 may further generate a command for controlling the robot at least partially based on the prediction.

In some embodiments, generating the command comprises determining a set of recording time points in a third time period for recording the feedback data, a start time point of a first time period for receiving the feedback data deviating from a start time point of the third time period by a predetermine time delay; determining, based on the prediction, a predicted time point when the first object reaches the target position; determining a predicted trajectory through which the first object moves to the target position based on the set of recording time points, the feedback data, the predicted time point and the prediction of the target position; and generating the command based on the predicted trajectory.

Figure 6:
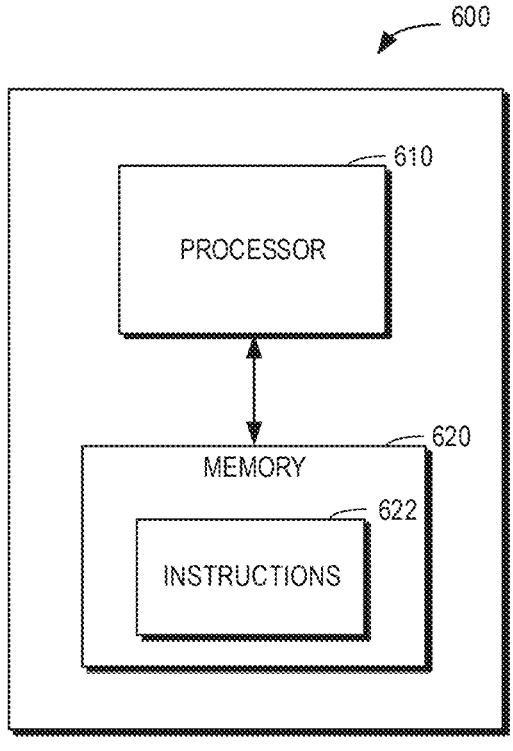
FIG. 6 shows a block diagram of an example computer readable medium in accordance with some example embodiments of the present disclosure.

FIG. 6 is a simplified block diagram of a device 600 that is suitable for implementing embodiments of the present disclosure. The device 600 may be provided to implement the system 200 as shown in FIG. 6. 26. As illustrated in FIG. 6, the device 600 may comprise a computer processor 610 coupled to a computer-readable memory unit 620, and the memory unit 620 comprises instructions 622. When executed by the computer processor 610, the instructions 622 may implement the method for controlling the robot as described in the preceding paragraphs, and details will be omitted hereinafter.

In some embodiments of the present disclosure, a computer readable medium for simulating the at least one object in the manufacturing line is provided. The computer readable medium has instructions stored thereon, and the instructions, when executed on at least one processor, may cause at least one processor to perform the method for controlling the robot as described in the preceding paragraphs, and details will be omitted hereinafter.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for controlling a robot comprising:

determining, based on feedback data received from the robot during at least one first movement, first position information of a joint of the robot, the feedback data indicating a movement of the joint to which a tool being attached for holding a first object;

determining second position information of the joint of the robot based on sensing data received from a sensor during the at least one first movement, the sensing data indicating a relative movement between the joint and a second object to be aligned with the first object;

generating, based on the first position information and the second position information, a prediction of a target position for aligning the first object with the second object; and driving the joint of the robot to the target position based on a predicted trajectory for guiding the first object from a current position to the target position determined during the at least one first movement of the robot, wherein the predicted trajectory is based on feedback data received from the robot during the at least one first movement;

wherein the first position information comprises a set of first sampled parameters characterizing a reference position of the joint at one or more first predetermined time points during the at least one first movement, wherein the second position information comprises a set of second sampled parameters characterizing a set of reference position relationships between the joint of the robot and the second object at one or more second predetermined time points during the at least one first movement; and wherein the prediction of the target position is generated by fusing the set of first sampled parameters at the one or more first predetermined time points and the set of second sampled parameters at the one or more second predetermined time points based on a predetermined fusion mode associated with an expected operation to be performed by the robot;

wherein, for a first given predetermined time point, determining the first set of sampled parameters comprises:

determining third position information based on a sensor arranged on the joint, the third position information comprising a third sampled parameter characterizing a reference position relationship between the second object and the joint at the first given predetermined time point during the at least one first movement, obtaining, from the set of first sampled parameters of the first position information, a first sampled parameter at a first time point and a first sampled parameter at a second time point based on the third position information of the joint, determining a first sampled parameter at the first given predetermined time point based on the third sampled parameter, the first sampled parameter at the first time point, and the second sampled parameter at the second time point, wherein the first time point occurs before the first predetermined time point and the second time point occurs after the first predetermined time point.

2. The method of claim 1, wherein determining the first position information comprises:

receiving the feedback data from the robot in a first time period;

obtaining, from the feedback data, a set of coordinate parameters of the robot in a first coordinate system of the robot; and determining the first position information based on the set of coordinate parameters.

3. The method of claim 1, wherein determining the second position information comprises:

receiving the sensing data from the sensor in a second time period, the second time period at least partially overlapping with a first time period for receiving the feedback data;

obtaining, from the sensing data, a set of position relationships between the first object and the second object in a second coordinate system of the sensor; and determining the second position information based on the set of position relationships.

4. The method of claim 1, wherein the predetermined fusion mode comprises at least one of:

a predictor mode, a filter mode, a sum mode, or a subtraction mode.

5. The method of claim 1, further comprising:

generating a command for controlling the robot at least partially based on the prediction.

6. The method of claim 5, wherein generating the command comprises:

determining a set of recording time points in a third time period for recording the feedback data, a start time point of a first time period for receiving the feedback data deviating from a start time point of the third time period by a predetermine time delay;

determining, based on the prediction, a predicted time point when the first object reaches the target position;

determining a predicted trajectory through which the first object moves to the target position based on the set of recording time points, the feedback data, the predicted time point and the prediction of the target position; and generating the command based on the predicted trajectory.

7. A system for controlling a robot comprising:

a data collector coupled to the robot and configured to determine, based on feedback data received from the robot from at least one first movement, first position information of a joint of the robot, the feedback data indicating a movement of the joint to which a tool being attached for holding a first object, and coupled to a sensor and configured to determine second position information of the joint of the robot based on sensing data received from the sensor, the sensing data indicating a relative movement between the joint and a second object to be aligned with the first object;

a first estimator coupled to the data collector and configured to generate, based on the first position information and the second position information, a prediction of a target position aligning the first object with the second object; and a command generator coupled to the robot and configured to generate at least one move command to drive the joint of the robot to perform the at least one first movement, to drive the joint of the robot to the target position based on a predicted trajectory for guiding the first object from a current position to the target position, wherein the predicted trajectory is based on feedback data received from the robot during the at least one first movement;

wherein the first position information comprises a set of first sampled parameters characterizing a reference position of the joint at one or more first predetermined time points during the robot movement;

wherein the second position information comprises a set of second sampled parameters characterizing a set of reference position relationships between the joint of the robot and the second object at the one or more second predetermined time points; and wherein the first estimator generates the prediction of the target position by fusing the first set of sampled parameters at the one or more first predetermined time points and the second set of sampled parameters at the one or more second predetermined time points based on a predetermined fusion mode associated with an expected operation to be performed by the robot;

wherein, for a first given predetermined time point, determining the first set of sampled parameters comprises:

determining third position information based on a sensor arranged on the joint, the third position information comprising a third sampled parameter characterizing a reference position relationship between the second object and the joint at the first given predetermined time point during the at least one first movement, obtaining, from the set of first sampled parameters of the first position information, a first sampled parameter at a first time point and a first sampled parameter at a second time point based on the third position information of the joint, determining a first sampled parameter at the first given predetermined time point based on the third sampled parameter, the first sampled parameter at the first time point, and the second sampled parameter at the second time point, wherein the first time point occurs before the first given predetermined time point and the second time point occurs after the first given predetermined time point.

8. The system of claim 7, wherein the data collector is further configured to:

receive the feedback data from the robot in a first time period;

obtain, from the feedback data, a set of coordinate parameters of the robot in a first coordinate system of the robot; and determine the first position information based on the set of coordinate parameters.

9. The system of claim 7, wherein the data collector is further configured to:

receive the sensing data from the sensor in a second time period, the second time period at least partially overlapping with a first time period for receiving the feedback data;

obtain, from the sensing data, a set of position relationships between the first object and the second object in a second coordinate system of the sensor; and determine the second position information based on the set of position relationships.

10. The system of claim 7, wherein the predetermined fusion mode comprises at least one of:

a predictor mode, a filter mode, a sum mode, or a subtraction mode.

11. The system of claim 7, further comprising:

a command generator coupled to the first estimator and configured to generate a command for controlling the robot at least partially based on the prediction.

12. The system of claim 11, wherein the command generator is further configured to:

determine a set of recording time points in a third time period for recording the feedback data, a start time point of a first time period for receiving the feedback data deviating from a start time point of the third time period by a predetermine time delay;

determine, based on the prediction, a predicted time point when the first object reaches the target position;

determine a predicted trajectory through which the first object moves to the target position based on the set of recording time points, the feedback data, the predicted time point and the prediction of the target position; and generate the command based on the predicted trajectory.

13. An electronic device comprising:

a processor; and a memory coupled to the processor and storing instructions for execution, the instructions, when executed by the processor, causing the electronic device to perform the method of claim 1.

14. A non-transitory computer readable medium comprising program instructions for causing an electronic device to perform at least the method of claim 1.

15. The method of claim 1, wherein, for a second given predetermined time point, determining the first set of sampled parameters comprises:

determining fourth position information based on the sensor arranged on the joint, the fourth position information comprising a fourth sampled parameter characterizing the reference position relationship between the second object and the joint at the second given predetermined time point, obtaining, from the set of first sampled parameters of the first position information, a first sampled parameter at a third time point and a first sampled parameter at a fourth time point based on the fourth position information of the joint, and determining a first sampled parameter at the second given predetermined time point based on the fourth sampled parameter, the first sampled parameter at the third time point, and the first sampled parameter at the fourth time point, wherein the third time point occurs before the second given predetermined time point and the fourth time point occurs after the second given predetermined time point.

16. The method of claim 1, wherein the feedback data received from the robot comprises:

a first signal curve associated with the first position information, and a second signal curve associated with the second position information.

17. The system of claim 7, wherein, for a second given predetermined time point, determining the first set of sampled parameters comprises:

determining fourth position information based on the sensor arranged on the joint, the fourth position information comprising a fourth sampled parameter characterizing the reference position relationship between the second object and the joint at a second given predetermined time point, obtaining, from the set of first sampled parameters of the first position information, a first sampled parameter at a third time point and a first sampled parameter at a fourth time point based on the fourth position information of the joint, and determining a first sampled parameter at the second given predetermined time point based on the fourth sampled parameter, the first sampled parameter at the third time point, and the first sampled parameter at the fourth time point, wherein the third time point occurs before the second given predetermined time point and the fourth time point occurs after the second given predetermined time point.

18. The system of claim 7, wherein the feedback data received from the robot comprises:

a first signal curve associated with the first position information, and a second signal curve associated with the second position information.

* * * * *